G. A. STEINLE.
LATHE.
APPLICATION FILED MAY 25, 1908.

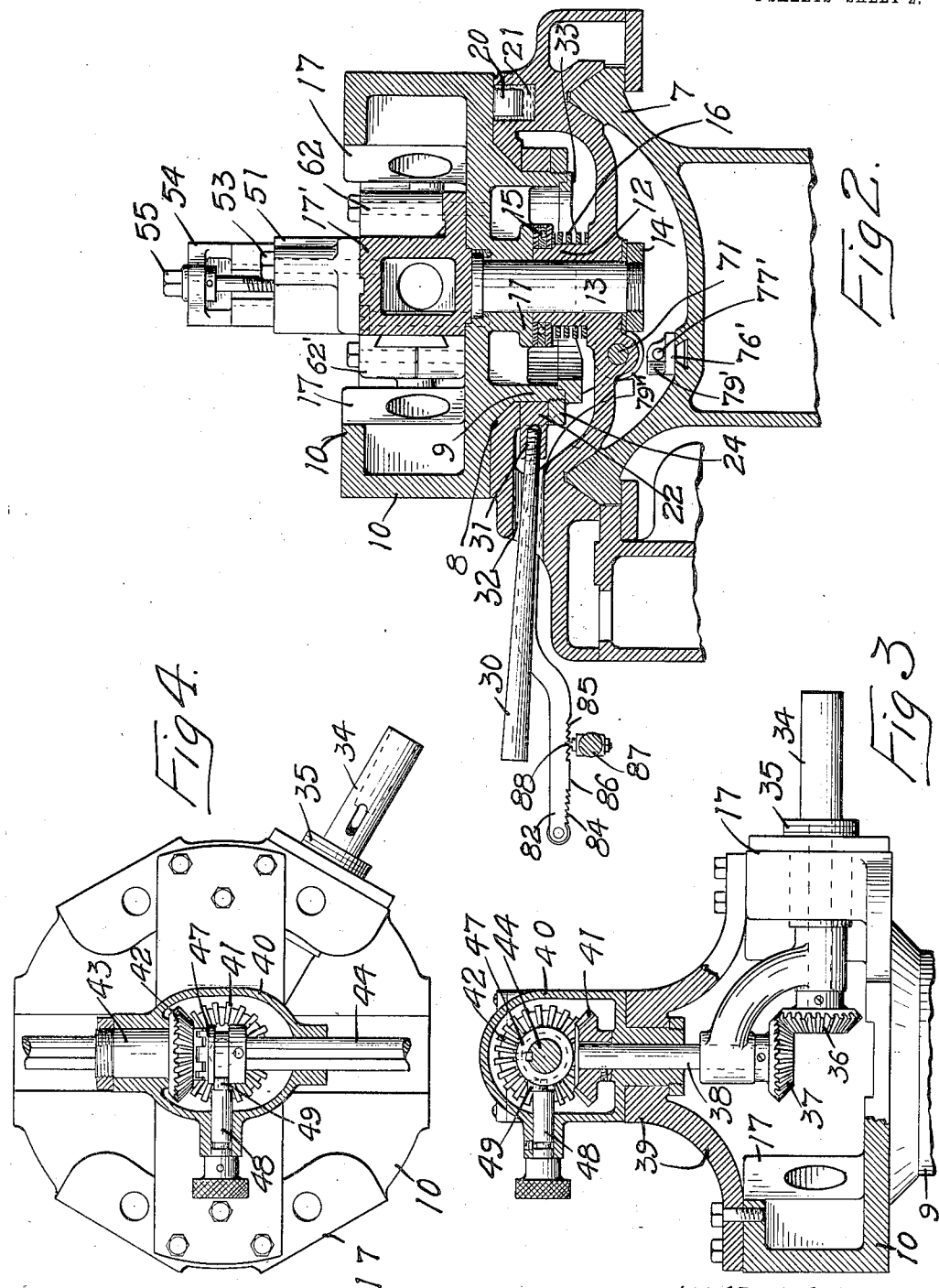
G. A. STEINLE.
LATHE.
APPLICATION FILED MAY 25, 1908.
946,989.
Patented Jan. 18, 1910.
4 SHEETS—SHEET 2.
WITNESSES
INVENTOR
GEORGE A. STEINLE
BY Paul & Paul
HIS ATTORNEYS

946,989.

Patented Jan. 18, 1910.
4 SHEETS—SHEET 3.

WITNESSES

INVENTOR
GEORGE A. STEINLE
BY Paul & Paul
HIS ATTORNEYS

G. A. STEINLE.
LATHE.
APPLICATION FILED MAY 25, 1908.
946,989.
Patented Jan. 18, 1910.
4 SHEETS—SHEET 4.
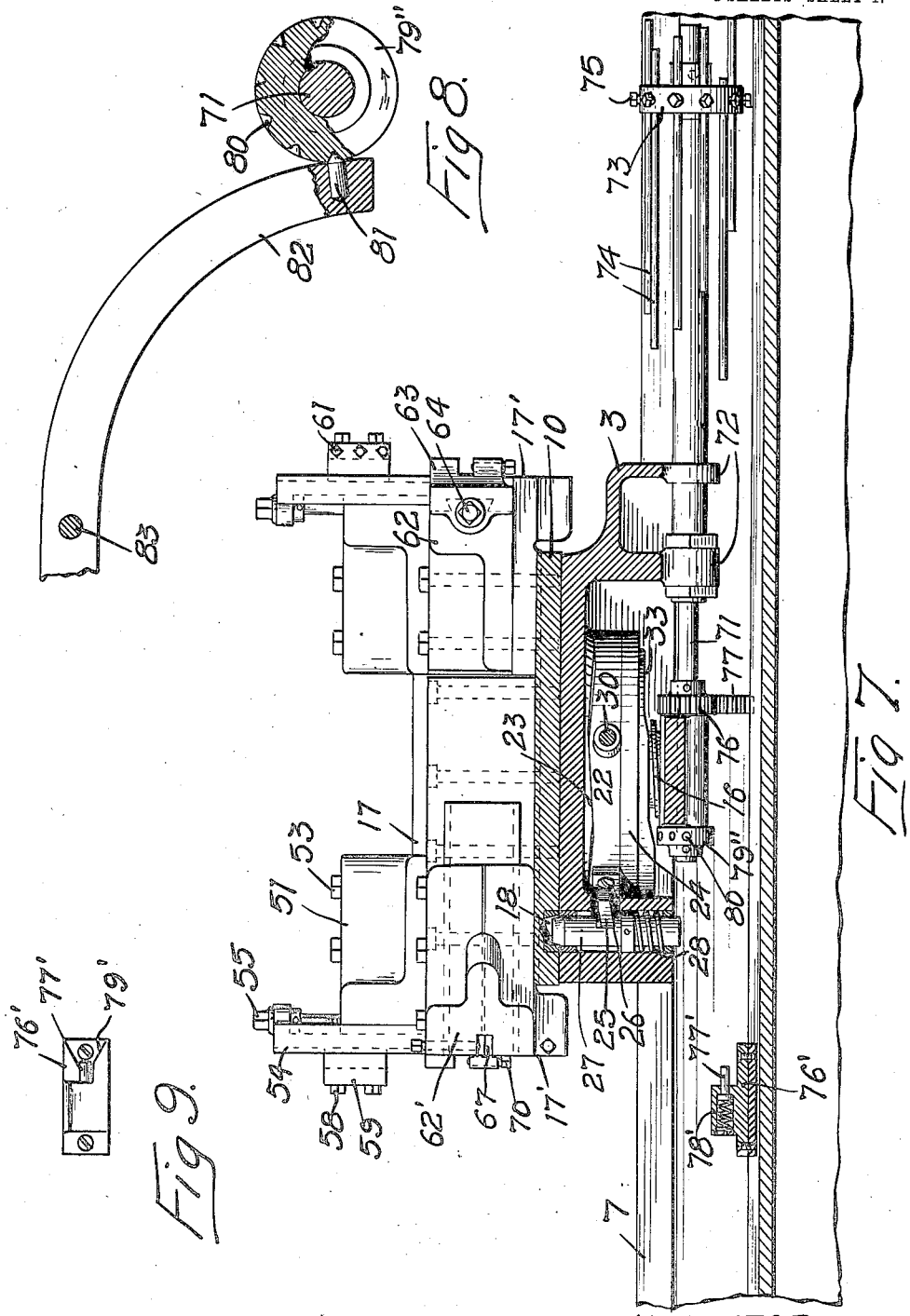
WITNESSES
INVENTOR
GEORGE A. STEINLE
BY Paul & Paul
HIS ATTORNEYS

UNITED STATES PATENT OFFICE.

GEORGE A. STEINLE, OF MADISON, WISCONSIN, ASSIGNOR TO STEINLE TURRET MACHINE COMPANY, OF MADISON, WISCONSIN, A CORPORATION.

LATHE.

946,989.  Specification of Letters Patent. Patented Jan. 18, 1910.

Application filed May 25, 1908. Serial No. 434,889.

*To all whom it may concern:*

Be it known that I, GEORGE A. STEINLE, of Madison, Dane county, Wisconsin, have invented certain new and useful Improvements in Lathes, of which the following is a specification.

This invention relates to lathes of the turret type and the object of the invention is to provide an improved form of turret having means whereby the work of drilling can be facilitated, and upon which facing heads, that have practically no over-hang from the face of the turret, may be mounted.

Other objects of the invention will appear from the following detailed description, taken in connection with the accompanying drawings, in which—

Figure 1:
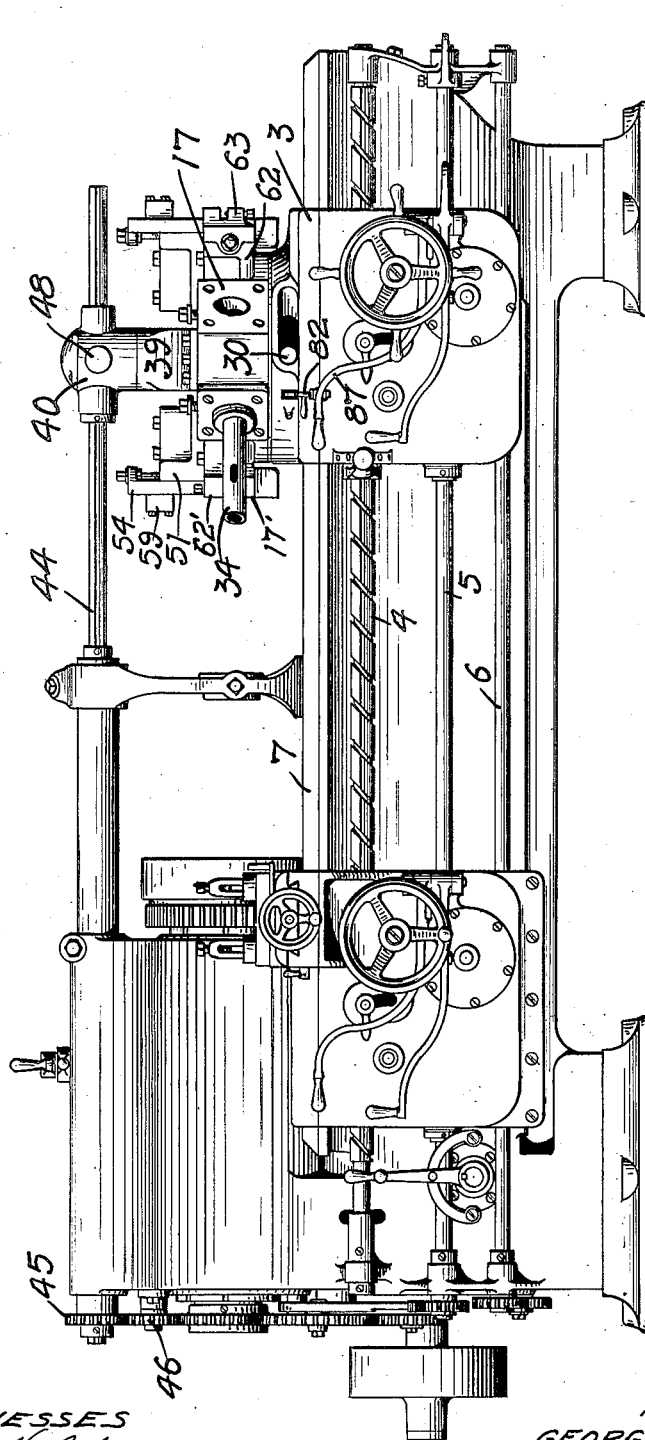
Figure 5:
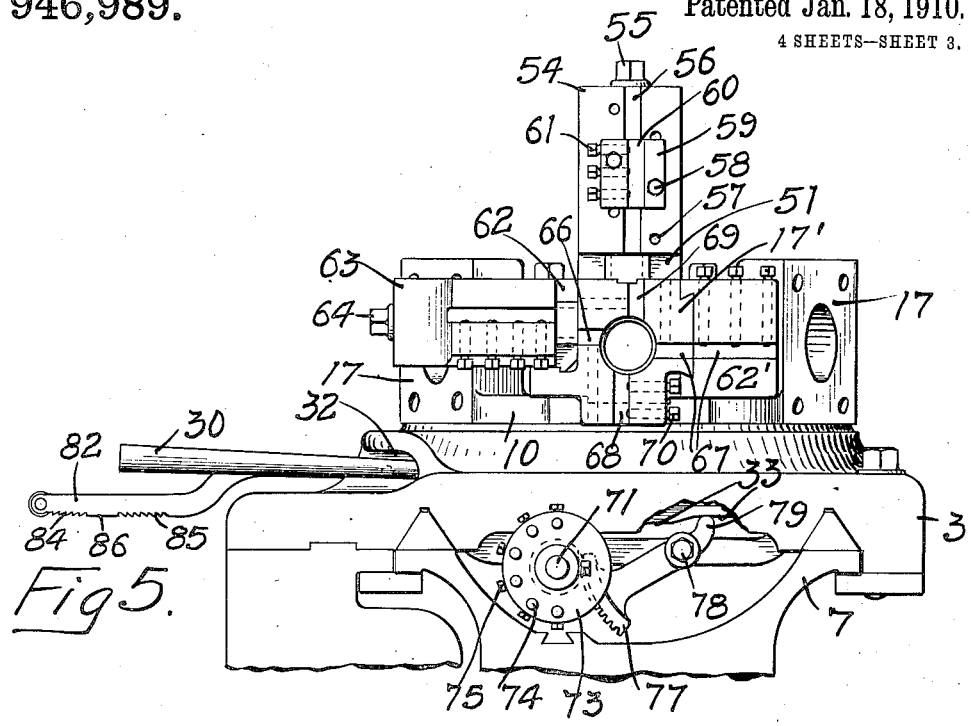
Figure 6:
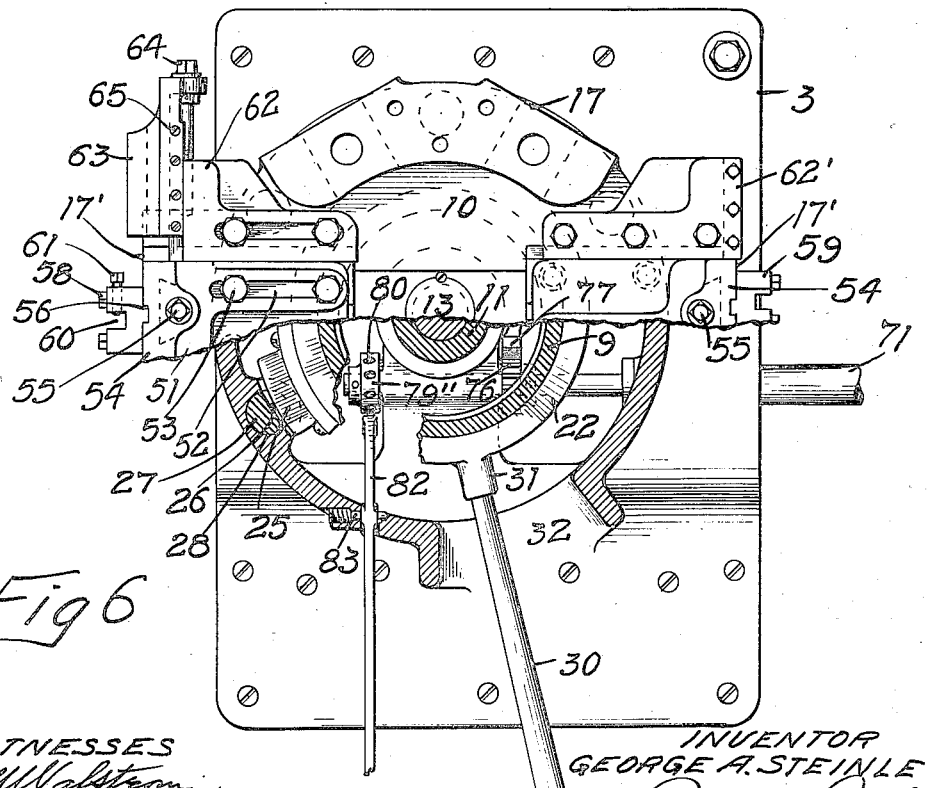

Figure 1 is a side elevation of a turret lathe embodying my invention. Fig. 2 is a detail sectional view, taken transversely of the lathe-bed and through the turret, illustrating the construction of the same, and the manner of mounting it on the carriage. Fig. 3 is a detail sectional view, illustrating a portion of the drive mechanism from the lathe spindle to the drill carrier. Fig. 4 is a top view of the same partially in section, illustrating the clutch-device by means of which the drive is rendered operative or inoperative. Fig. 5 is a side elevation of the turret, showing the adjustable facing blocks, and a portion of the mechanism for tripping the lathe carriage drive at a predetermined time. Fig. 6 is a top view of the same, partially in section, illustrating the turret lock and another portion of the carriage-drive tripping mechanism. Fig. 7 is a sectional view through the carriage and a portion of the lathe bed, illustrating the location of the mechanism thereon by which the carriage-drive is controlled. Fig. 8 is a detail view of a portion of the tripping mechanism. Fig. 9 is a top view of the stop device on the lathe bed by means of which the tripping mechanism is actuated.

In Fig. 1 of the drawings I have illustrated a complete lathe. Portions of this machine are described and claimed in Letters Patent of the United States issued to me March 23, 1909, No. 915,900, and in pending applications Serial No. 410,367, filed January 11, 1908, and Serial No. 424,159, filed March 30, 1908.

The present application relates particularly to improvements in the turret and the means by which, through the turret, the movement of its supporting carriage is controlled.

In Fig. 1 of the drawings, I have illustrated two movable carriages. The present application, however, relates particularly to the carriage shown at the right of Fig. 1 of the drawings and on which the turret is supported. This carriage is designated in the drawing by the reference numeral 3. Upon the same figure of the drawings, 4, 5 and 6 represent, respectively, the normally stationary lead-screw-shaft, the feed-shaft and the speed-shaft. 7 represents the bed of the lathe on which the carriage is adapted to slide. This carriage has a seat 8 for the hub 9 of the turret 10. The hub 9 incloses a depending boss 11 that is adapted to rest upon a stud 12 formed on the carriage 3 (see Fig. 2). A bolt 13 passes down through the boss 11 and the stud 12 is provided with a lock-nut 14 on its lower end, by means of which the turret is secured on the carriage. A ball-bearing 15 is interposed between the boss 11 and the stud 12, and a compression spring 16 is provided on said stud and serves to relieve the dead load of the turret thereon, permitting it to revolve freely to obtain the various adjustments.

The turret is provided with a series of head-blocks 17, which are shown as formed integrally with said turret. These head-blocks are adapted to support and hold suitable tools. There may be any desired number of these head-blocks, but I prefer to provide four of them arranged in pairs on opposite sides of the turret with intermediate spaces between them, in which are mounted the facing heads 17'. The upper face of the turret is preferably provided with a suitable groove 17'' and the facing heads 17' are preferably provided with a tongue or rib, which fits into said groove, as indicated by dotted lines in Fig. 7, and said facing heads are secured in position on the turret by bolts, or other suitable means.

I have shown in Fig. 7 of the drawings one long and one short facing head. As here shown, the facing head 17', at the left, extends inward beyond the center of the turret, while the facing head 17', at the right, does not extend to the center of the turret.

In Fig. 6 of the drawings, I have shown the facing heads 17', both short, or not extending to the center of the turret. It will be seen that with this construction of the turret, having the head-blocks 17 arranged in pairs with intermediate spaces between them, I am enabled to use the facing heads 17' of any desired length. I may use a single long facing head, or two short heads, or one long head and one short head, and these facing heads, being arranged in the spaces between the ends of the opposite pairs of head-blocks 17, do not need to overhang the outer circumference of the turret, but may be adjusted on the base of the turret to any desired position and they form supports for the tool holders, as hereinafter described, and upon which said tool holders may be adjusted, either parallel with the line of movement of the turret slide, or at right angles thereto. This construction of the turret and this arrangement of the facing heads insure the greatest rigidity for finishing work with wide cutters.

A floating roller 20 (see Fig. 2) may be provided within an oil well 21 and is adapted to contact with the under surface of the turret head.

For the purpose of locking the turret, when adjusted, I provide a cam ring 22, mounted on the hub 9, between a cam surface 23, on the seat 8, and a ring 24 that is threaded on the lower end of said hub. The ring 22 has a limited oscillating movement, and carries a cam lug 25 that is adapted to enter a recess 26 in a locking pin 27 that fits within a socket 28 in the carriage, and is adapted to enter recesses 18 in the bottom of the turret and positively lock it against movement in either direction. The pin 27 is normally held in its raised position by a spring 27'. The locking ring is actuated by means of a lever 30, fitting within a socket 31, on said ring, and movable back and forth within an opening 32 in the wall of said carriage. By a slight movement of this lever the operator of the lathe can raise or lower the locking pin 27 and lock or release the turret.

On the lower end of the hub 9 I provide a cam surface 33, the purpose of which will hereinafter appear. In one of the head-blocks on the turret I provide a drill carrier 34, having a bearing 35, to resist end thrust of the drill, and projecting inwardly toward the center of the turret, and provided at its inner end with a miter-gear 36 meshing with a similar gear 37 on a vertical shaft 38 that is journaled in the hub 39 of a casting 40, mounted on the top of the turret. The shaft 38 has a gear 41 meshing with an idle gear 42, mounted on a sleeve 43, that is free to turn in bearings in the casting 40. A horizontal shaft 44 extends lengthwise of the lathe bed, and has a gear 45 that is driven through a train of gears 46 from the lathe spindle. A clutch 47 is splined on the shaft 44 and is adapted to lock the idle gear 42 on said shaft, said clutch being operated by means of a pin 48 having an eccentric connection 49 with said clutch. By the rotation of this pin the operator of the lathe may transmit power from the spindle to drive a drilling tool on the turret. This tool, when so driven, will turn in the opposite direction from the work carried by the chuck, and the operation of the drill be facilitated and the capacity of the lathe increased. Other head-blocks on the turret may be equipped with a drive mechanism, if desired. The principle, however, is sufficiently illustrated in the example shown.

Upon the turret I provide a series of the adjustable face blocks or supports 17', hereinbefore described, wherein tools of various kinds may be carried at any desired angle. 51 is a tool-holder, adjustably supported upon each facing head 17' by means of a slot 52 and bolts 53. A block 54 has a dovetailed connection with the holder 51, and is adjustable thereon by means of a screw 55. This block, preferably, has a vertical slot 56, and is provided with holes 57 to receive bolts 58 on a tool carrier 59. This carrier has a slot 60, and a series of set screws 61. A similar holder 62 is adjustably mounted on each facing head 17', in the same manner as the holder 51, and carries a horizontal block 63 adjustable by means of a screw 64, and locked in the desired adjustment by set-screws 65. Upon loosening these screws and turning the screw 64, the block may be adjusted horizontally back and forth on its support. These holders, it will be noted upon an examination of Figs. 6 and 7, overhang the turret and do not, in any way, interfere with its free revolution.

In addition to the holders described, the facing heads are provided, as indicated in Fig. 5, with a series of slots 66, 67, 68 and 69, provided with screws 70, by means of which a facing tool may be secured in said slots. A block 62', corresponding substantially to the block 62, is preferably mounted on the opposite side of the facing-head, and has a slot forming a continuation of the slot 67. By means of these different tool-holders, the turret may be easily and quickly adapted for any work desired. The movement of the carriage is controlled by a mechanism illustrated and described in my pending application filed March 30, 1908, Serial No. 424,159, and I will now proceed to describe a releasing or tripping mechanism by means of which the carriage drive gear is rendered inoperative at a predetermined point dependent upon the adjustment of the turret.

71 is a shaft supported in gearings 72 on the turret carriage, parallel with the lathe-bed, and carries a wheel 73, wherein a series of rods 74 are adjustably held, by means of set screws 75. These rods are capable of independent lengthwise adjustment in their support. A pinion 76 is secured on said shaft. A segmental rack 77, adapted to engage said pinion, is pivoted at 78 on the turret carriage, and has an arm 79 which projects into the path of the cam ring 33, and is actuated to rotate the shaft 71 when the turret is revolved. A stop 76' is mounted on the lathe bed and carries a pin 77' that is normally held forward by a spring 78'. The stop 76' has an inclined surface 79' (see Fig. 9) which, when engaged by one of the rods 74, will cause rotation of the shaft 71, the particular rod engaging the stop device being determined by the adjustment of the turret. For instance, there will preferably be as many rods 74 as there are head-blocks on the turret, and the rotary adjustment of the turret will determine the rod to engage the stop device and trip the carriage operating gear. After tripping the feed mechanism, the turret carriage may be brought forward by hand, so that any one of the rods 74 can be brought solidly against the stop 76', thereby giving a repetition of exact measurements from the turret tools to the face of chuck or work being operated upon. A disk 79" is secured on the end of the shaft 71 and has a series of recesses 80 therein to receive a pin 81 mounted in a lever 82, that is pivoted at 83 on the carriage, and has ratchet teeth 84 and 85, with a smooth surface 86 between them. The carriage operating lever 87 has a pin 88 to engage the ratchet teeth, and lock the said lever in position to drive the carriage forward or backward, the intermediate adjustment between the ratchet teeth being the neutral or inoperative position.

Upon the rotation of the shaft 71 by the stop block 76', the lever 82 will be tilted on its pivot, disengaging the pin 81 from its recess in the disk, and allowing the lever 87 to move to the neutral position, between the ratchet teeth, at which point the carriage driving gears will be rendered inoperative and the carriage will stop.

The turret receives an additional support from the frame at the opposite end of the machine through the shaft 44, which has a sliding connection with the casting 40, in which the vertical shaft 38 is mounted. This connection assists in maintaining the rigid position of the turret when the tools are in operation.

The details of the construction may be varied in many particulars without departing from my invention.

I claim as my invention:

1. The combination with a lathe bed including a head stock and carriage, of a turret mounted on said carriage, and provided with an upright standard, a driving shaft receiving motion from the head stock, and having a pair of spaced bearings in the upper portion of the standard, said bearings being arranged to permit free movement of the turret and carriage, a tool holder mounted in said turret, and a vertical driving connection arranged centrally of the standard for transmitting motion from the shaft to the tool holder.

2. In a lathe, including a head stock, a carriage, a turret mounted on the carriage, and provided with an upright standard having a pair of spaced bearings, a shaft extending through the bearings, and having a driving connection with the head stock, said shaft having a key way for approximately its entire length, a miter gear mounted loosely on the shaft, a clutching member arranged to revolve with the shaft, and adapted to engage said miter gear, a tool holder, mounted in the turret and provided with a miter gear, and a vertical shaft arranged centrally of the standard and provided with gears connecting said miter gears.

3. In a turret lathe, a carriage, a turret table provided with a series of head blocks, and having a diametrically extending groove in its upper face, and a facing head mounted in said groove, and adjustable along the length thereof.

4. In a turret lathe, a carriage, a turret table revolubly mounted thereon, and provided with head blocks arranged in diametrically opposed pairs, the upper face of the table being provided with a diametrically arranged groove extending across the table between the pairs of head blocks, and a facing head adjustable longitudinally of said groove.

5. The combination, with a carriage, of a turret having a depending hub seated thereon, a rotating locking ring mounted on said hub, a lug carried by said ring and having a cam surface, a pin, movable within a socket in said carriage, and adapted to enter a recess in said turret and lock the same against revolution, said pin having a part engaged by said lock, and means for rotating said ring to move said pin to its locking or releasing position.

6. The combination, with a carriage, of a turret, mounted to revolve thereon, and having a depending hub, a locking ring rotatably mounted on said hub and having a cam surface to engage a corresponding surface provided on said carriage, said hub having a part between which and said fixed cam surface said ring is rotatable, a pin mounted in said carriage and adapted to enter a recess in said turret and lock it against movement, said pin having a recess in one side and a lug having a cam surface mounted on said ring and fitting within said recess, whereby when said ring is rotated said pin will be reciprocated.

7. The combination, with a carriage, of a turret having a depending hub seated on said carriage, said turret having a boss inclosed by said hub, and said carriage having a stud to coincide with said boss, a king bolt passing down through said boss and stud, and pivotally connecting said turret and carriage, said stud having a coiled spring thereon and a ball-bearing interposed between said spring and said boss, said spring being under compression and relieving the dead load of the turret on its seat.

8. The combination, with a lathe bed, and a carriage thereon, and means for driving said carriage, of a shaft mounted in said carriage, a wheel secured thereon, a rod adjustable lengthwise in said wheel, means connected with said shaft and actuated thereby for tripping said driving means, and means in the path of said rod for operating the same and rotating said shaft at a predetermined point in the movement of the carriage.

9. The combination, with a lathe bed, of a carriage mounted thereon, means for driving the same, a revolving turret mounted on said carriage, a shaft carried by said carriage, a stop device, means mounted on said shaft and arranged to engage said stop device and cause the partial rotation of said shaft, said stop engaging means being located at different distances from said stop device and corresponding in number to the tool-holders on said turret, means actuated by the rotary adjustment of said turret for revolving said shaft and adjusting said actuating means until the means representing a certain tool holder is in line with the stop device, and means actuated by the revolution of said shaft for rendering said driving means inoperative, substantially as described.

10. The combination, with a lathe bed, of a carriage mounted thereon and having a driving means and a tripping mechanism therefor, a turret mounted on said carriage and having a hub provided with a cam surface, a shaft mounted on said carriage and having a pinion, a rack bar arranged to engage said pinion and having an arm in contact with said cam surface, whereby rotary movement of said turret will impart a corresponding rotary movement to said shaft, a series of shaft rotating devices mounted thereon and corresponding in number to the tool holders on said turret, a stop device in the path of said shaft rotating devices, a rotary adjustment of said turret determining the particular shaft rotating device that is adjusted in line with said stop device, said shaft rotating devices being adapted to engage said stop device at different points in the movement of the carriage, and said tripping mechanism having a part actuated by the rotation of said shaft for rendering said driving means inoperative, substantially as described.

11. The combination, with a lathe bed, of a carriage mounted thereon, and having a driving means and a tripping mechanism therefor, a turret mounted on said carriage and having a series of tool holders, a shaft carried by said carriage, a disk secured thereon, a series of rods adjustably mounted in said disk lengthwise of said shaft, a stop device in the path of said rods and causing the rotation of said shaft at predetermined points in the movement of said carriage, mechanism connecting said shaft with said turret and whereby the rotation of said turret will impart a corresponding movement to said shaft and adjust a certain rod in line with said stop device, and means whereby the rotation of said shaft will actuate said trip mechanism to render said driving means inoperative.

In witness whereof, I have hereunto set my hand this 7th day of May 1908.

GEORGE A. STEINLE.

Witnesses:
G. S. MARTIN,
JENNIE B. DAVIS.